2,700,012

MANUFACTURE OF CHEWING GUM FOR FLUORINE PROPHYLAXIS

Frederick G. Merckel, Montclair, and Laszlo Reiner, Essex Fells, N. J., assignors to Wallace & Tiernan Company, Inc., a corporation of New Jersey No Drawing. Original application February 5, 1949, Serial No. 74,854. Divided and this application September 19, 1951, Serial No. 247,364

3 Claims. (Cl. 167—93)

This invention relates to compositions for effectuating fluorine treatment of the teeth, and more particularly to a chewing gum, and to methods of preparing such a gum, that will release combined fluorine in use, under circustances rendering the fluorine effective for its known property of inhibiting dental caries. Appropriate treatment with small quantities of a fluoride either by topical application under special conditions, or by ingestion, has been found remarkably beneficial in preventing or reducing the incidence of dental caries, notably when the treatment is applied to children during the period of tooth formation, e. g. for a number of years beginning with about the fourth year of age. As a matter of theoretical interest there is reason to believe that the benefit of such treatment can be in substantial measure attributed to (1) the resistance of fluorine-containing enamel to erosion by acid products of bacteria, and (2) the poisoning effect of fluorine to the acid forming enzymes of bacteria. Regardless of theory, however, the importance of fluorine in the constitution of decay-resistant tooth structure has been abundantly demonstrated by extended studies, and likewise the fact that ingested as well as locally applied fluorine is readily incorporated into the teeth.

Except in the rare case of community water supplies that naturally carry a proper amount of fluoride, application of the compound by ingestion has not been widely adopted, doubtless for lack of a method that is easy to control and that does not represent a tiresome kind of medication. Topical application, as recommended by dental authorities, involves very careful cleaning of the teeth, and then painting them with a solution of sodium fluoride or the like. According to present understanding there should be a course of such treatments, e. g. once a week for a period of four to eight weeks, and the course should be repeated at least once a year or so for at least three years or preferably throughout the critical period of tooth development in the child, as from the age of four to the age of fourteen or beyond. The solution used must have a relatively substantial concentration of fluoride and must therefore be applied with great care because of the general toxicity of fluorine when taken internally in large doses. By reason of the nature of the treatments in the above and other respects, they can only be administered (with safety and reliability) by dentists or physicians or perhaps by registered nurses under immediate supervision of a dentist or physician, all of whom are already overburdened with other and more immediately critical duties. To the patient, likewise, each annual course of fluoride treatments represents a long series of separate visits that may be individually brief but become tedious and annoying by protracted repetition. Moreover, because of the expense of the treatment, it could not be made available to the majority of the population.

While surface application is undoubtedly of great benefit, certain investigators have found that it does not give full protection for a prolonged period of time, e. g. unless the courses of treatment are repeated with at least the frequency mentioned above, or even more often. It has also been observed that it is necessary for the individual to ingest the fluorine in order to obtain its deposition in the deeper layers of the enamel and in the dentine.

The present invention is designed to provide a pleasant, convenient and expeditious manner of fluorine prophylaxis, e. g. for administration by and under the supervision of members of the dental and medical professions, and is specifically directed to a novel chewing gum whereby the fluorine may be supplied in a safe, readily controllable way and with an effectiveness that has been truly demonstrated, i. e. by actual tests evaluated in the light of the many reported clinical investigations of fluorine prophylaxis. In a more particular sense, the invention stems from a finding that the mere addition of sodium fluoride or the like to chewing gum compositions of the sort ordinarily available fails to yield a significantly useful release of fluoride, even upon prolonged chewing. With this difficulty in view, the present improvements rest on the discovery that the non-availability of the fluoride may be overcome, and further on the discovery of specific and highly effective ways of preparing the material to afford ready separation of fluoride when the gum is chewed.

Extensive tests have indicated that chewing gum bases contain material which tends to prevent the release of fluorine during the process of chewing, i. e. when a soluble fluoride has been incorporated in a suitable, small quantity with such gum base. The soluble fluoride becomes converted to an insoluble form that remains mixed with the gum and is not leached out by the saliva. More specifically investigation of available chewing gum bases has revealed the presence of combined calcium in a form that reacts with the fluoride to yield a highly insoluble compound, which, whether simple or complex, may be here considered as calcium fluoride. The calcium may be present in the gum base in various forms which all appear to have the stated fluorine-blocking property and can be conveniently defined as slightly soluble, such characterization meaning a solubility sufficient, relative to the insolubility of calcium fluoride, to promote reaction between the calcium compound and the sodium or like fluoride for production of an insoluble fluoride. It will be understood that references herein to solubility or insolubility means solubility or insolubility in water.

Perhaps the most common base of chewing gum compositions is the natural plant resin known as chicle. This material itself has been found to contain combined calcium, chiefly as calcium arabate, which has the undesirable, fluorine-blocking property mentioned above. Other natural gums used in chewing gum bases similarly appear to contain calcium, for example, as the calcium salt of so-called sugar acids or carbohydrate acids, of which calcium arabate is the most common example.

There is also some indication that gum bases may contain other materials, such as combined magnesium, adapted to have a reaction of similar effect with the small amount of fluoride that is appropriate for incorporation in chewing gum for the present purpose. In any event, it has now been found that the fluorine-retaining property of the various original and prepared gum bases may be effectively obviated by a treatment which is designed to deal with calcium compounds, such treatments being thus apparently of equal effect for magnesium or other alkali earth compounds to the extent that they are present and constitute a source of difficulty in the gum.

Not only do the natural gums contain fluorine-blocking material, but commercially prepared gum bases, which are most convenient for use in manufacturing a prophylactic chewing gum of the character here contemplated, are customarily made up with a quantity of calcium carbonate as a filler, such filler being ordinarily necessary to provide the optimum firmness, texture and other properties required of a chewing gum. The calcium carbonate is extremely undesirable for present purposes since it reacts readily with a soluble fluoride to form insoluble calcium fluoride, which fails to be released when the gum is chewed.

For safety in various respects, the releasable fluoride content to be employed in a chewing gum is preferably very small, for example of the order of one part by weight of fluoride (measured as fluorine) in 500 to 5000 parts of the gum when one convenient-sized piece of the gum is to be chewed per day. In accordance with the experience of investigation of fluorine prophylaxis, an ingested daily dose of 0.3 to 1.5 mg. (milligrams) of fluorine is of at least substantial benefit for the desired purpose of inhibiting dental caries. Somewhat greater amounts, as was found in a few localities having a water supply of very high fluorine content, have the desired prophylactic effect and are insufficient to be toxic, but when taken over a prolonged period of time may have the objection of producing a mottled or other discoloration of the teeth. Much larger doses of fluoride, of course, are apt to have toxic effects. Since the useful concentration of fluorine in a chewing gum is thus relatively minute, even small quantities of the objectionable calcium or like compounds can interfere seriously with the release of fluoride. For instance, it is understood that chicle may contain as much as 8% or so of calcium arabate, corresponding to a calcium content of about 1%, far more than sufficient to react with all of a soluble fluoride which is included in the proportions mentioned above, viz. 0.2 to 0.02% (measured as fluoride). Indeed, for example, if the fluorine content is 0.1%, as much as 10% of it is effectively blocked by a calcium content of only one part in 10,000.

Another example of a fluorine-blocking gum material is a commercial gum base distributed under the trade name of "Polojam." This product, which is otherwise suitable for preparation of chewing gum, is understood to consist of a mixture of natural gums that are processed and combined with some synthetic material, plasticizer and calcium carbonate filler. The natural gums are stated to be: Jelutong gum, Catiau gum, Hangkang gum, Lechicasti gum, Pendari gum and ester gum, as well as chicle, which is obtained from the Sapondilla tree. These natural ingredients always appear to contain calcium, mainly in the form of calcium arabate; for that reason as well as because of the presence of calcium carbonate filler, attempts to prepare a fluorine-releasing gum from such base were unsuccessful, specifically in that no useful quantity of fluoride could be separated during the chewing process. In this, as in the case of other experiments where a small quantity of soluble fluoride was simply mixed into a natural or prepared gum base, analysis of samples which had been subjected to prolonged chewing showed that practically all of the fluorine remained in the gum.

In the manufacture of a caries-inhibiting chewing gum according to the present invention, a suitable chewing gum base is first treated, e. g. by procedure involving the application of a compound capable of reacting with slightly soluble calcium compounds to convert the calcium to a substantially different degree of solubility, so as to disable the gum base of its fluorine-blocking property. Thereafter the treated gum material is appropriately combined with the small amount of a soluble fluoride, e. g. sodium fluoride. Flavoring ingredients and the like, including sugar and if desired, other specific flavoring, may also be incorporated. The resulting product is a chewing gum, which can be finished in pieces of convenient size and which may be made to correspond in taste and other properties with popular types of ordinary chewing gum.

In use, the resulting fluorine-containing gum is simply chewed by the individual, say one piece per day, and automatically provides an effective administration of fluoride. So prepared and used, the gum is capable of functioning in a three-fold manner consonant with established principles of fluorine prophylaxis. In the first place, the operation of chewing the gum has an effective cleaning function relative to the teeth, corresponding to the cleansing treatment heretofore followed in the topical application of fluoride. As chewing proceeds, a part of the contained and released fluoride is understood to be directly applied to the teeth, for immediate absorption. Finally, the remainder of the released fluoride, which may be by far the major part, is appropriately ingested, since it remains dissolved in the saliva. Thus the chewing of the gum combines the advantages of cleansing, surface application and ingestion, without the use of special equipment and technical personnel heretofore employed for topical administration, and without the uncertainty of quantitative control that has characterized other methods for treatment by ingestion. Furthermore, even if it is assumed that the proportion of fluorine directly absorbed by the teeth during the chewing operation is negligible, all that is not so absorbed must be taken by ingestion, and the amount thus necessarily ingested is amply sufficient for the desired prophylactic purpose.

One specific procedure for disabling the fluorine-retaining property of the chewing gum base involves treatment of the material with an aqueous solution of an acid which will react with calcium compounds of the character of calcium arabate and calcium carbonate to dissolve and thus eliminate them. For instance the chicle or other gum preparation is warmed until it reaches a more or less molten condition and is then extracted with an aqueous solution of a water soluble acid e. g. a mineral acid such as hydrochloric acid or an organic one such as acetic acid, which reacts with the inhibitory substance in the gum, converting it to a soluble form that is removed with the treating solution. As indicated, a suitable acid is one which will form a water soluble calcium salt, preferred reagents being the acids named above. Another example is phosphoric acid, when used in ample excess to insure solution and removal of the calcium in the form of acid phosphate. In the case of hydrochloric or acetic acids respectively, the combined calcium in the gum or gum base is converted to calcium chloride or acetate, which is dissolved in the acid solution and separated with it, the treatment being followed by thorough washing of the gum base with water, to remove any appreciable, remaining amounts of both the acid and the soluble calcium compounds. The resulting gum base is remarkably lacking in fluoride-inhibitory effect and can be aptly described as substantially calcium-free.

Another procedure to eliminate inhibitory substances from the gum by chemical reaction involves treating the gum base with a substance which will saturate, so to speak, the fluoride-combining ingredient. Sodium oxalate and, in general, other compounds which form highly insoluble salts with alkaline earth metals could be used for this purpose, for example, sodium phosphate. Free acids should not be used in quantities which would shift the hydrogen ion concentration below neutrality. A soluble fluoride can also be used to saturate the fluoride blocking material in the gum. In this case the unreacted excess soluble fluoride is carefully washed out of the gum by triturating the gum with water until free from fluoride. Where the reagent used is a salt, either organic or inorganic, the cationic ingredient is preferably sodium, potassium, lithium, ammonium or substituted ammonium, i. e. a cationic radical which may be conveniently defined as of the class of alkali metals. The procedure may simply involve taking the selected reagent, for example in the proportion of 0.5 to 10 parts per hundred parts (by weight) of the gum base, depending chiefly on the calcium content of the latter, and thoroughly mixing the added reagent with the gum so that the desired saturating reaction occurs, before any fluoride is added. In this way the calcium, for example, is converted to a highly insoluble and non-reactive form such as normal calcium oxalate, normal calcium phosphate, or the like, ingredients which, as shown by extensive test, may remain in the gum base without significant effect in impeding the ultimate release of a soluble fluoride added thereafter. In general, these compounds having the desired property of inertness relative to soluble fluoride in the gum, are substantially as insoluble as calcium fluoride itself (differing only slightly one way or the other), and considerably less soluble than substances such as calcium arabate.

Present experience has indicated that for optimum results with commercial gum bases, a combined procedure is preferred, namely first applying a solution of hydrochloric acid or the like to dissolve at least a substantial part of the calcium, then neutralizing and washing the gum thoroughly, and finally adding a small quantity of a substance such as sodium oxalate or sodium phosphate which will act to saturate any remaining calcium or like inhibitory materials.

Further steps in manufacture of the fluorine-containing gum may include the admixture of suitable filling and flavoring ingredients, to the extent desired, and the incorporation of a soluble fluoride, conveniently sodium fluoride, or that of potassium, lithium or ammonium, or the like. If a filler is employed, it should be selected to have no fluoride-blocking properties. Examples of suitably inert substances, conveniently used in a finely pulverulent form, are calcium oxalate, barium sulfate, charcoal and talc; where a calcium-saturating reagent has been used, its reaction product may constitute at least part of the filler. The total amount of filler may depend somewhat on its particle size (if separately added), being somewhat greater for larger particle sizes, but usually lies in the range of 1 to 5 parts per hundred parts of the gum, by weight. Sugar and other flavoring materials are included to the extent desired and conveniently in the same, final mixing step the active ingredient, e. g. sodium fluoride, can be incorporated.

As intimated above, the actual amount of fluoride to be embodied in the gum may vary within a considerable range. Where the product is made up (as it usually should be) in pieces each representing a convenient quantity for chewing, the fluoride content of each piece is preferably such as to facilitate prescription of the product for the desired prophylaxis. Thus a piece of the usual gum tablet size, weighing about one gram, may advantageously contain 2 mg. of sodium fluoride, affording about 0.9 mg. of fluorine, of which 80% to 90% or better is leached out on chewing for not more than about 10 minutes. According to reported experience, oral administration (chiefly for ingestion) of such amount represents a safe, effective, daily dose. Manifestly, smaller concentrations of fluoride in the gum will permit prescription of larger quantities of gum to be chewed per day, or will permit a smaller fluorine dosage on the basis of one piece per day or less frequently. The upper limit of fluoride content is, as indicated above, the safe maximum dosage, having in mind the frequency of use and the maximum single dose of fluoride that is possible without toxic effects. For instance, the manufactured pieces of gum might contain, say, 4 mg. of sodium fluoride apiece; but in such event, the dentist or physician would usually prescribe no more than one piece every two or three days, except perhaps for brief periods. In every case, too, the prescription usually takes into account the other fluorine intake of the patient, no fluoride treatment being ordinarily prescribed when the drinking water contains 0.5 p. p. m. (parts per million) or more, of fluorine.

It will now be seen that the chewing gum product is aptly characterized as adapted to supply fluorine to the user and may be defined as the combination of a gum base or gum base material with a soluble fluoride, such gum base or gum base material being free of calcium or fluorine-inhibiting ingredients, and such base or base material also including other substances such as sweetening and flavoring compositions, and likewise fillers, plasticizers and the like as appropriate to ordinary chewing gums.

The following are specific examples of methods herein described for the treatment of gum base and the preparation of the novel chewing gum to which the present invention is directed, it being understood that a variety of ingredients and formulating steps may be employed, in accordance with procedures otherwise appropriate to the manufacture of chewing gum, so long as the gum material is free of calcium or fluorine-inhibiting substances at the time that the fluoride is incorporated, and so long as no such substances are then or thereafter added to the gum.

*Example I*

One hundred (100) pounds of chicle are placed in a steam jacketed kettle and heated until the gum assumes a thick syrupy consistency. It is then mixed with one hundred (100) gallons of dilute hydrochloric acid (i. e. 3–4% HCl, or about normal) and agitated thoroughly with a mechanical stirrer for fifteen (15) minutes. The chicle is then allowed to settle; the supernatant liquid is siphoned off and replaced by half the amount of water, and the mixture again stirred for ten (10) minutes. The water washing of the chicle is continued until the water becomes only slightly acid to Congo; then it is washed with dilute sodium bicarbonate solution and again with water until the wash water is practically neutral. One hundred and fifty (150) pounds of finely powdered sugar are mixed with one-half (½) pound of sodium fluoride by first mixing equal amounts of sugar with the fluoride and then gradually adding, while mixing continuously, the rest of the sugar so that a thorough distribution of the sodium fluoride in the sugar is achieved. Eighty (80) pounds of corn syrup are then mixed with the gum base in a steam jacketed kettle and the medicated sugar, prepared as stated above, is added to it while agitating continuously. The mixing is continued for about half an hour and is finally allowed to cool, whereupon the gum is ready for ultimate processing, i. e. by extrusion, cutting or other mechanical treatment, into squares or sticks, having a weight of about one (1) gram each. These pieces can be coated or used uncoated.

*Example II*

Ten (10) pounds of "Polojam" gum base are placed in a steam jacketed kettle and heated to about 90° C. When the gum base is molten, eight (8) gallons of 5% solution of acetic acid in water is added and mixed for twenty (20) minutes under continuous mechanical agitation. The gum is then allowed to settle, the aqueous solution is siphoned off and replaced with an equal volume of 2% sodium bicarbonate solution and subsequently washed several times with demineralized water. The gum base is then heated in the steam jacketed kettle until it is dry. It is mixed with ten (10) pounds of syrup, e. g. corn or other sugar syrup, into which fifty-five (55) grams of sodium fluoride have been dissolved; then thirteen (13) pounds of sugar and one (1) pound of finely powdered charcoal are added. The material is heated for half an hour under continuous mixing and the resulting gum is processed into squares or sticks as desired.

*Example III*

One hundred (100) pounds of pure chicle are mixed with one (1) pound of sodium oxalate at a temperature of 95° C. After such mixing has continued for about thirty minutes to insure reaction or saturation of fluorine-blocking ingredients, the temperature is allowed to go to 90° C. and medicated syrup, as described in Example II above, is added. Further processing may be carried out, likewise as indicated above, to yield the desired pieces of fluorine-containing chewing gum.

*Example IV*

Thirty (30) pounds of pure chicle and ten (10) pounds of gum arabic are mixed with one (1) pound of sodium fluoride in a steam jacketed kettle and heated to about 90° C. After the mixing has continued for about thirty (30) minutes the mixture is washed with warm water several times until the last washing is free from fluoride when tested by a reagent (thorium nitrate-alizarine) capable of detecting less than one (7) p. p. m. of fluoride. The chicle thus processed is then mixed with eight (8) pounds of sorbitol, forty-five (45) pounds of mannitol and a mixture of three (3) pounds of urea, 1.9 pounds of diammonium phosphate, and 0.1 pound of sodium fluoride. The mixing is continued until the ingredients are well distributed and the resulting gum is processed into squares or sticks as desired. Flavor may be added to make the gum more palatable and saccharine may be added to sweeten it. This gum base possesses the advantage of being free from carbohydrate material from which the acid is formed through the action of lactobacilli which attacks the dental enamel and dentine. Any acid which may be formed is neutralized by the buffer that is present. The urea is added to help the dissolution of dental plaques.

The treatments involving heating of the gum base are preferably carried to no higher temperature than necessary for the desired fluidity and chemical treatment, taking care to avoid damaging the gum itself by heat. For instance, in the case of the acid treatment it is best to keep the temperature well below 100° C., since prolonged digestion of the gum with an acid might somewhat impair its useful properties. The finally compounded gum, containing the soluble fluoride, is divided into pieces of convenient size and shape and may, if desired, be given a candy or sugar coating of the usual sort appropriate to chewing gum tablets. Ordinarily, chewing a one gram piece of any of the above products for about five minutes releases (to the saliva) upwards of 80% of its fluorine content. The proportions of ingredients in the foregoing examples were selected so that one gram pieces of the compounded gum each contain about 2 mg. of sodium fluoride; larger or smaller pieces can of course be made, containing correspondingly greater or less amounts of fluoride.

As stated above, it is important to eliminate calcium carbonate or its fluorine-blocking effect, e. g. in gum bases which contain it as a filler. Although calcium carbonate per se is highly insoluble, it in fact behaves in chewing gum as if it were at least slightly soluble, thus coming within the category of compounds herein so defined. Apparently it is either decomposed by acids present in natural gum materials or by carbon dioxide from the air, to form the more soluble bicarbonates, which react quite readily with sodium fluoride or the like. Hence any calcium carbonate in the gum should either be dissolved out, or its calcium content converted to a form truly insoluble under the circumstances.

This application is a division of our copending application Serial No. 74,854, filed February 5, 1949, for Manufacture of Chewing Gum for Fluorine Prophylaxis.

It is to be understood that the invention is not limited to the specific procedures and compositions herein described, but may be carried out in other ways without departure from its spirit.

What is claimed is:

1. A method of making chewing gum which is adapted to supply fluorine to the user, comprising treating a gum composition that contains calcium in a form adapted to react with soluble fluoride to yield insoluble calcium fluoride, by applying to said gum composition a substance which will react with the combined calcium to yield a calcium compound substantially as insoluble as calcium fluoride, said applied substance being selected from the class consisting of alkali metal oxalates, alkali metal phosphates, and soluble fluorides, thereby effecting such conversion of the calcium into the last-mentioned highly insoluble form and disabling the gum composition from reaction with soluble fluoride, and thereafter intimately mixing with the gum composition a small amount of a soluble fluoride, the last-mentioned soluble fluoride being added in quantity to provide a prophylactically effective but non-toxic amount of fluorine in the chewing gum.

2. The method described in claim 1 wherein the substance with which the gum composition is treated is an alkali metal oxalate.

3. The method described in claim 1 wherein the substance with which the gum composition is treated is a soluble fluoride which reacts with the calcium to form insoluble fluoride, the method including removing any excess soluble fluoride at the end of said treatment by washing the gum, so that the subsequent addition of a small amount of a soluble fluoride provides essentially the only releasable fluoride in the gum.

References Cited in the file of this patent

UNITED STATES PATENTS

| | | |
|---|---|---|
| 2,218,172 | Kokatnur | Oct. 15, 1940 |
| 2,449,184 | Strean | Sept. 14, 1948 |

OTHER REFERENCES

Dobbs, Jour. Am. Dent. Assn., vol. 31, 1944, pages 832 to 842.

Bibby, Jour. Am. Dent. Assn., vol. 34, January 1947, pages 26 to 32.

Jour. Dent. Res. (I. A. R. D.), June to August 23 Genl. Meeting, "Prevention of Dental Caries by Brushing the Teeth with Powdered Fluorapatite" (McClendon et al.).